United States Patent
Wang et al.

(10) Patent No.: US 9,562,969 B2
(45) Date of Patent: Feb. 7, 2017

(54) METHOD FOR OPERATING A HANDHELD SCREENING DEVICE AND HANDHELD SCREENING DEVICE

(71) Applicant: Sony Corporation, Minato-ku (JP)

(72) Inventors: Qi Wang, Stuttgart (DE); Furkan Dayi, Stuttgart (DE); Ralf Boehnke, Esslingen (DE); Marcel Daniel Blech, Herrenberg (DE); Miquel Testar, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 617 days.

(21) Appl. No.: 14/057,093

(22) Filed: Oct. 18, 2013

(65) Prior Publication Data

US 2014/0168013 A1    Jun. 19, 2014

(30) Foreign Application Priority Data

Dec. 19, 2012  (EP) .................................... 12008454

(51) Int. Cl.
| | | |
|---|---|---|
| *G01S 1/00* | (2006.01) | |
| *G01S 13/00* | (2006.01) | |
| *G01S 13/89* | (2006.01) | |
| *G01S 13/86* | (2006.01) | |
| *G01S 13/88* | (2006.01) | |

(52) U.S. Cl.
CPC ............. *G01S 13/89* (2013.01); *G01S 13/867* (2013.01); *G01S 13/887* (2013.01)

(58) Field of Classification Search
CPC ................................ G01S 13/89; G01S 13/887

USPC .................................. 342/66, 179, 185, 385
See application file for complete search history.

(56) References Cited

U.S. PATENT DOCUMENTS

| | | | | |
|---|---|---|---|---|
| 4,984,073 A | * | 1/1991 | Lemelson ................. | B07C 5/10 348/130 |
| 6,417,797 B1 | | 7/2002 | Cousins et al. | |
| 2009/0195435 A1 | | 8/2009 | Kapilevich et al. | |
| 2010/0117885 A1 | | 5/2010 | Holbrook et al. | |
| 2010/0302240 A1 | | 12/2010 | Lettvin | |
| 2011/0026772 A1 | * | 2/2011 | Hagan ................... | H04N 19/124 382/104 |
| 2012/0306681 A1 | * | 12/2012 | Elad ....................... | G01S 13/867 342/27 |

OTHER PUBLICATIONS

Luna Innovations Incorporated, "Weapons and Non-permitted Devices Detector (WANDD)", 2006-IJ-CX-K023, Nov. 2009, 48 pages.
U.S. Appl. No. 14/053,885, filed Oct. 15, 2013. Wang, et al.

* cited by examiner

*Primary Examiner* — Dao Phan
(74) *Attorney, Agent, or Firm* — Oblon, McClelland, Maier & Neustadt, L.L.P.

(57) ABSTRACT

A method for operating a handheld screening device is provided, including taking a first image; determining a region of interest in the first image; and generating a scanned image by an active radar scan of the region of interest. A corresponding handheld screening device is provided as well.

18 Claims, 5 Drawing Sheets

METHOD FOR OPERATING A HANDHELD SCREENING DEVICE AND HANDHELD SCREENING DEVICE

BACKGROUND

Field of the Disclosure

The present disclosure relates to a method for operating a handheld screening device and a handheld screening device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A variety of conventional systems are available for obtaining images through visibly opaque materials. For example, X-ray systems have been utilized to acquire images of objects that are hidden from visual inspection by visibly opaque materials (e.g., anatomical structures or objects within a luggage). X-ray systems, however, have many disadvantages. By way of example, such systems can be expensive and bulky, and can utilize ionizing radiation that may pose health hazards to humans. Moreover, X-ray systems typically detect a beam that has been transmitted through a target sample, thus requiring access to both sides of the target. Ultrasound imaging systems, in turn, require the presence of a continuous, high quality acoustic transmission path between a transducer and a "hidden" object of interest. In many cases, however, such acoustic transmission paths may be not available.

Millimeter-wave imaging systems have recently been developed for securing screening applications. Millimeter-waves are particular useful for detecting objects in an active radar system, i.e. by emitting electromagnetic waves in the millimeter-wavelength region and detecting reflected or scattered electromagnetic waves.

There is a need to further improve the usability of screening devices based on millimeter-wave imaging systems.

SUMMARY

A method for operating a handheld screening device is provided including taking a first image, determining a region of interest in the first image, and generating a scanned image by an active radar scan of the region of interest.

Further, a handheld screening apparatus is provided including an active radar scan unit; and a processor to determine a region of interest in a first image and to control the active radar scan unit to generate an active radar scan of the region of interest.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
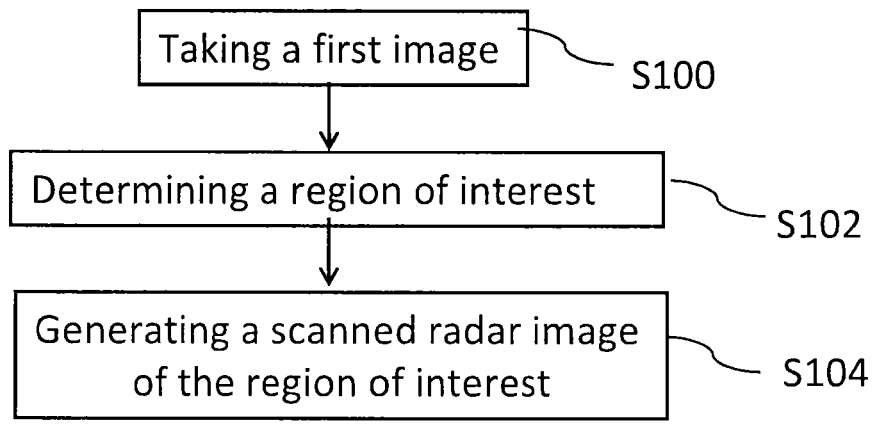
FIG. 1 shows schematically method steps according to an embodiment of the invention.

Referring now to the drawings, wherein like reference numerals designate identical or corresponding parts throughout the several views, FIG. 1 depicts steps of a method for operating a handheld screening device.

The term "handheld" used throughout the description might be understood to describe a device that can be carried (i.e. it is mobile) and operated by one or two hands and has preferably a weight less than 3 kg. A "handheld" device should approximately have geometrical dimensions (height, width, length) and weight as objects that are normally operated and/or carried by a person using one hand or two hands. Examples for such objects are a book, a smart phone, a cellular phone, an electronic reader, a tablet computer, a notebook computer, a stand still camera, a video camera, binoculars etc. Nevertheless, it should be understood that the device itself might be suited to be handheld, but in a particular application is mounted on a tripod or is otherwise fixed to a support when a stationary use of the device is envisaged.

In step S100 a first image is taken. The image can be taken by an optical camera, by a passive millimeter-wave sensor, by an active millimeter-wave sensor, i.e. a radar camera or by any other suitable sensor that is able to provide a two- or three-dimensional image of an object.

The object can be any object that should be searched for, for instance hazardous or dangerous devices, as e.g. arms like pistols, guns, knives, etc. or other devices with a characteristic shape, e.g. bottles with liquids. Of course, the method can be equally applied to search for other devices that can be hidden. The objects can include human beings wearing clothes, suitcases or boxes or any other object that can be used to hide a device as described hereinbefore. Whereas it should be understood that the devices might be searched for due to security reasons (i.e. weapons, dangerous items), it is equally well possible that the devices should be identified due to other reasons, for instance, an organizer of a festival is searching for bottles of liquids (as an 'unwanted item' in this scenario), since he wants to forbid bringing such bottles into the festival, because he wants to sell his own products.

Generally, the first image taken does not only include the object that should be searched for hidden devices, but also further background or foreground information, as e.g. further boxes or suitcases, further human beings surrounding the human being that should be searched for hidden objects; cars, buildings etc. surrounding the object that should be searched.

In a step S102 a region of interest is determined in the first image either by the user or a software algorithm. The region of interest is the region of the first image that should be more carefully examined.

Figure 2:
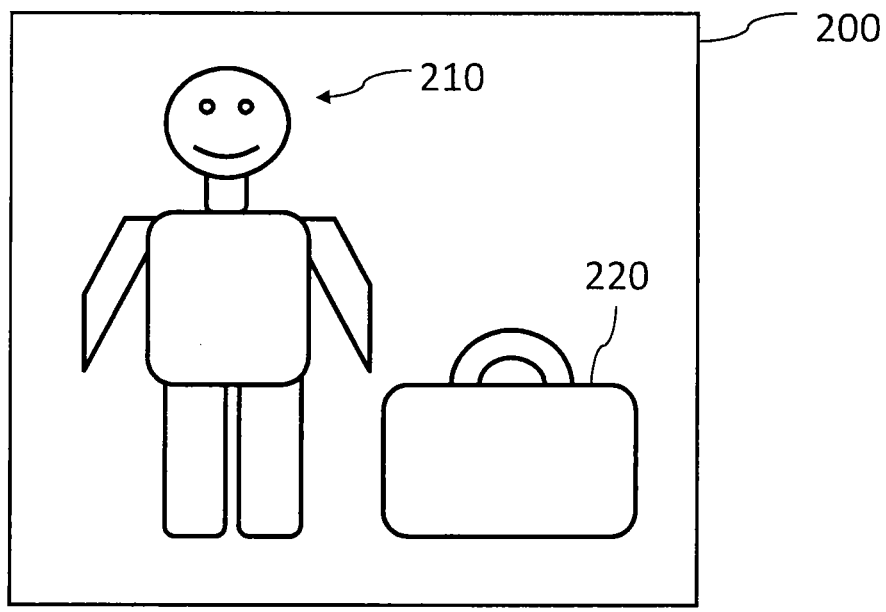
FIG. 2 shows schematically a first image taken by an imaging sensor.

For example the first image might look like the first image 200 depicted schematically in FIG. 2. The first image 200 could be displayed on a display of the handheld screening device or could be handled internally in a processor adapted to process the first image 200. Generally, the first image 200 might be formed from a pixel-matrix with a luminosity value and optionally a chromaticity value for each pixel of the pixel-matrix.

In the first image 200 depicted in FIG. 2 a person 210 and a suitcase 220 are shown. For sake of reducing complexity further background information is not shown, however, it should be clear that further background information e.g. a building or a street environment surrounding the person 210 and the suitcase 220 generally would be present.

Figure 3:
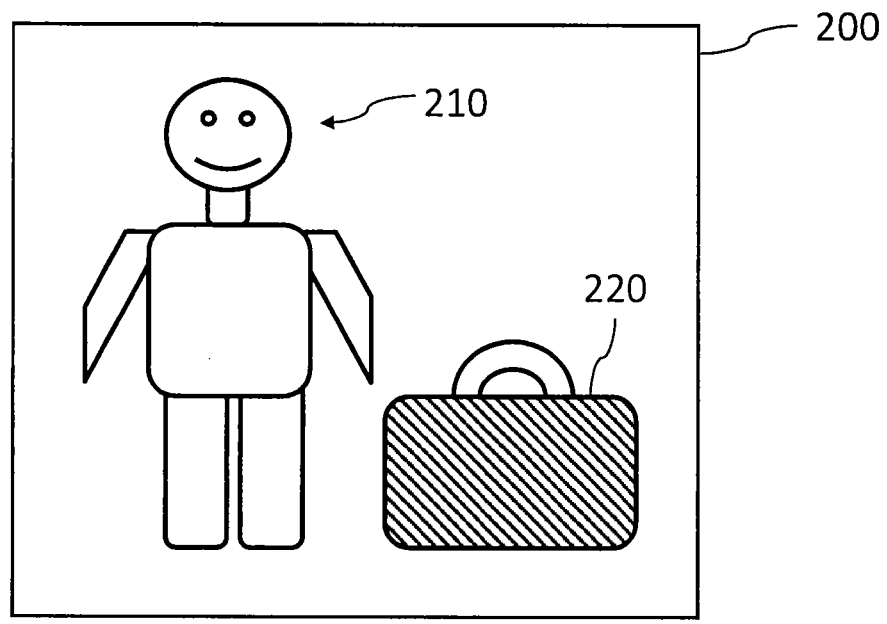
FIG. 3 shows schematically the identification of a region of interest in the first image according to an embodiment of the invention.

For instance, the suitcase 220 in the first image 200 is determined as the region of interest, as it is depicted in FIG. 3. The determination might be performed by an input of a user of the handheld screening device or might be performed automatically by image processing, e.g. by identifying characteristic shapes in the first image 200 and comparing the characteristic shapes with templates stored in a database. Further, it is possible that the region of interest might be identified by evaluating a first image resulted from radiometric passive camera, infrared camera or from a low-resolution or coarse active radar scan and identifying regions of interest to analyzed/scanned further and with a higher imaging quality (e.g. a higher resolution) which might be done in a second follow-up scanning.

In step S104 a second image is generated by scanning an active radar image of the region of interest. An active radar image is formed by emitting and receiving reflected/scattered electromagnetic radiation in an extended millimeter wavelength region. The frequency of the millimeter wavelength region radiation is considered to be within 10 GHz to 500 GHz.

Figure 4:
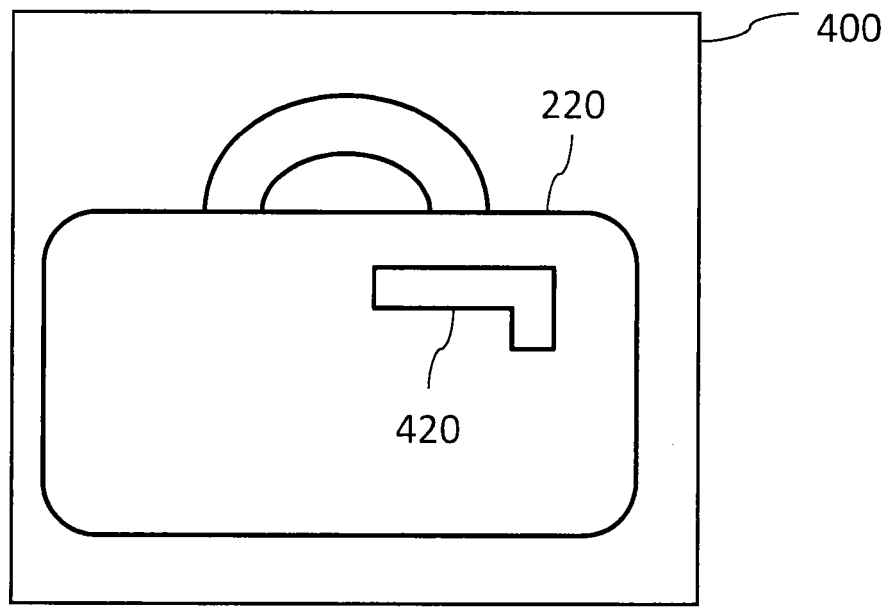
FIG. 4 shows schematically a displayed image after a second image has been taken by an active radar scan of the region of interest according to an embodiment of the invention.

An example of the second image 400 is depicted in FIG. 4. The second image 400 might show hidden objects that are detected by active radar scanning; here exemplarily a gun 420 is depicted. When the gun 420 is identified by the user of the handheld screening device visually or it is identified automatically by e.g. template matching with a template in a database, an alarm can be triggered.

As the suitcase 220 was identified as region of interest in FIG. 3, the second image 400 only includes the suitcase 220. Of course it is possible that some small regions near the suitcase 220 might be included in the second image 400 as well.

Due to the proposed method it is possible to focus with the active radar scan on the important regions and, therefore, the user of the handheld screening device can easily focus his attention on the critical region in order to find the hidden objects. Further effects might be to reduce the emission of radar signals in order to save energy and to reduce environmental influences by the emitted radar signals. Further, the speed of generating an active radar image with high-resolution might be increased, since it is not necessary to scan and visualize the complete region as depicted in the first image 200 with a high-resolution.

Figure 5:
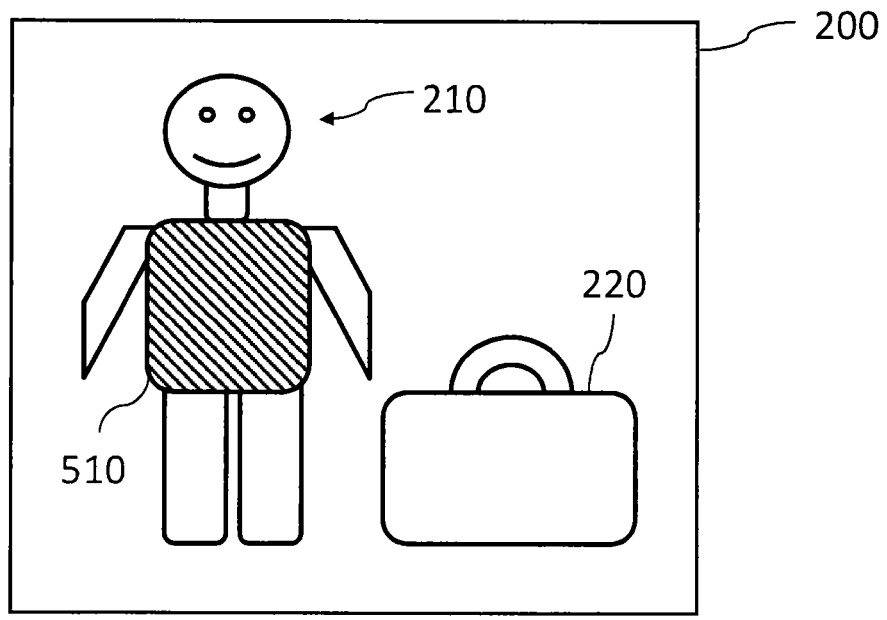
FIG. 5 shows schematically the identification of a region of interest in the first image according to another embodiment of the invention.
Figure 6:
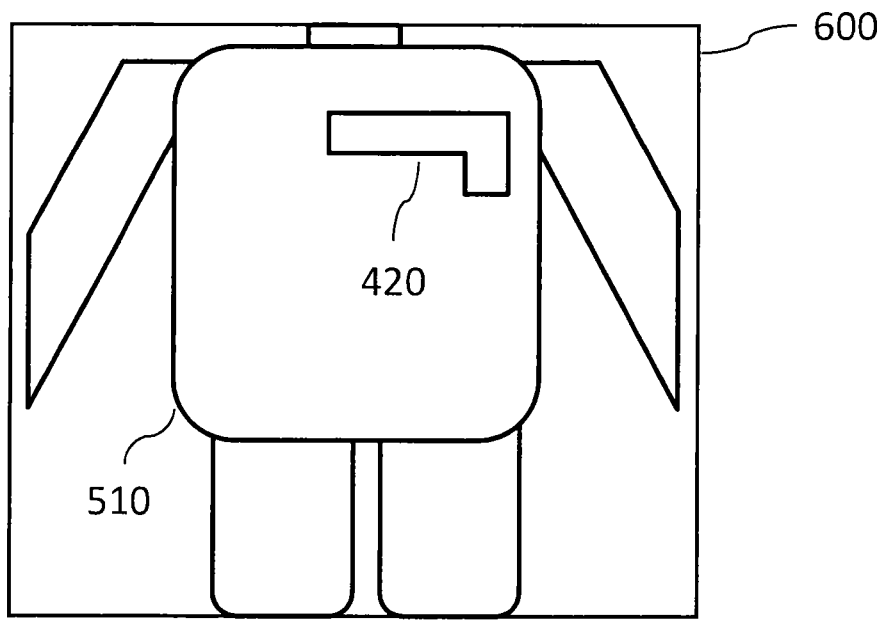
FIG. 6 shows schematically a displayed image after a second image has been taken by an active radar scan of the region of interest according an embodiment of the invention.

As it is depicted in FIGS. 5 and 6, it is of course possible that the region of interest is defined as the person 210 or a part (here the body 510 of the person 210) in the first image 200. This would result in an active radar scan of the body 510 for the further second image 600. A gun 420 hidden by the person 210, e.g. under his clothes, can be identified.

Figure 7:
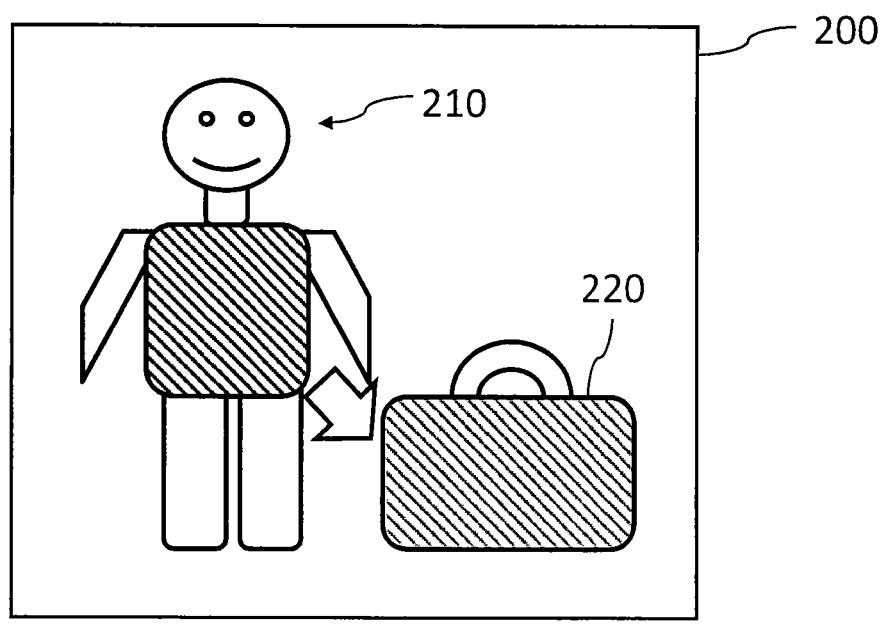
FIG. 7 shows schematically a displayed image of a first image with a proposal for a region of interest that can be changed by a user according to a further embodiment of the invention.

According to an embodiment depicted in FIG. 7, it is possible that a proposal for the region of interest is determined automatically (here the body 510 of the person 210). However, the user can change the region of interest from the body 510 to the suitcase 220. The change can e.g. by performed by moving a window on the display, by moving with a finger on a touch-screen display, by tapping on the selected region of interest on a touch-screen display or any other possible measure to mark and/or change displayed information.

It is also possible that the user decides to initiate a scan of the complete area depicted in the first image 200 instead of only scanning a smaller region of interest proposed automatically.

Figure 8:
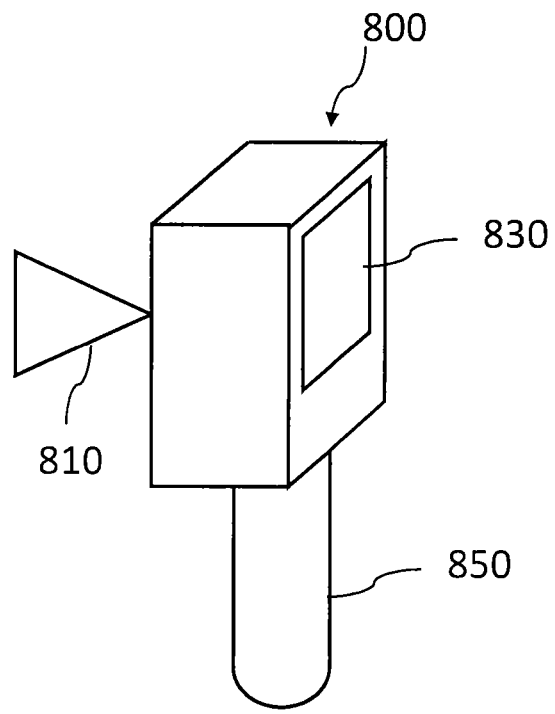
FIG. 8 shows schematically a perspective view of a handheld screening device according to an embodiment of the invention.
Figure 9:
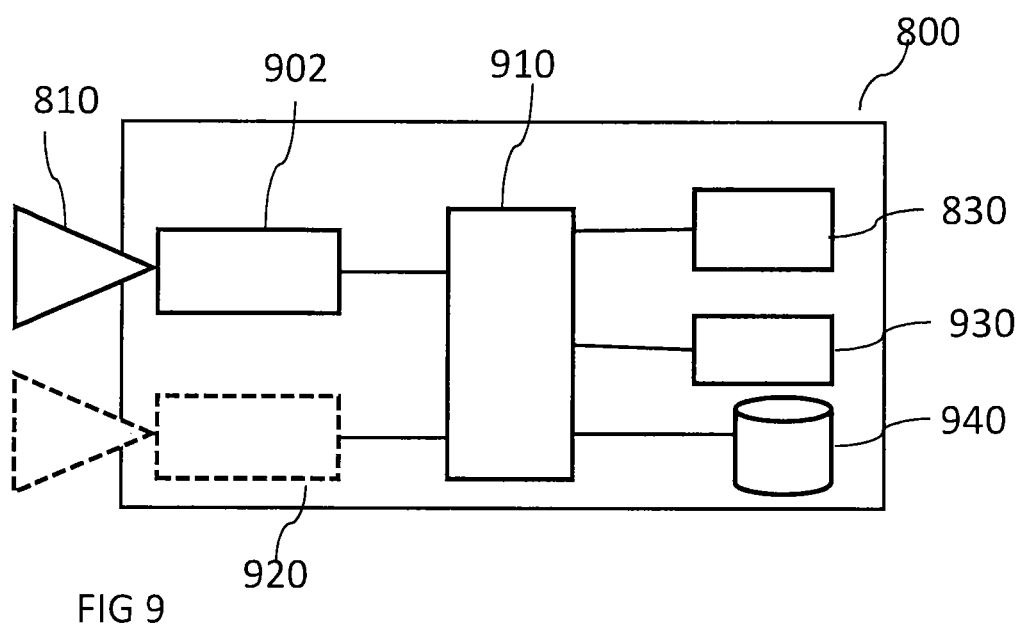
FIG. 9 shows schematically a block diagram of a handheld screening device according to an embodiment of the invention.

FIG. 8 depicts a perspective view and in FIG. 9 a schematic block diagram of the handheld screening device 800 is depicted.

The handheld screening device 800 includes an active radar scan unit 902 adapted to emit electromagnetic radiation and to receive reflected electromagnetic radiation in an extended millimeter wavelength region. The electromagnetic radiation or radar signals might be emitted in a specific beam pattern to cover/illuminate the scene (810). The frequency of the millimeter wavelength region radiation is within 10 GHz to 500 GHz.

A processor 910 is included into the security scanning device, which controls the active radar scan unit 902. Optionally a further camera 920 is provided which is used to take the first image 200. The further camera 920 might be an optical camera, an IR (infrared) camera, a thermal camera, a passive radar (radiometric camera), or any other suitable camera to take the first image 200. It is also possible that the first image 200 is generated by a low-resolution scan or coarse scan of the active radar scan unit 902 and the second image 400 of the region of interest is then generated by a high-resolution active radar scan.

The handheld screening device 800 might further include a display 830 to display the first image 200 and/or second image 400.

A grip 850 is provided so that a user can hold the handheld screening device 800 with one hand and can operate it easily.

An input mechanism 930 might be provided allowing the user to select the region of interest on the display 830 directly or by changing a preselected region of interest as depicted in FIG. 7. The input mechanism might include a mouse, a touchscreen, a keyboard, a track-ball or any other known input mechanism.

Further, the handheld screening device might include a database or storage unit 940. The database 940 might store templates for automatically identifying regions of interests and/or storing templates for identifying hidden objects in order to trigger an alarm automatically.

Obviously, numerous modifications and variations of the present disclosure are possible in light of the above teachings. It is therefore to be understood that within the scope of the appended claims, the invention may be practiced otherwise than as specifically described herein.

The present application claims priority to European Patent Application 12 008 454.6, filed in the European Patent Office on Dec. 19, 2012, the entire contents of which being incorporated herein by reference.

The invention claimed is:

1. A method comprising:
taking a first image;
determining a region of interest in the first image; and
generating a scanned image by an active radar scan of the region of interest, wherein
the step of determining a region of interest includes searching for regions in the first image that match templates stored in a database.

2. The method according to claim 1, wherein the first image is taken by an active radar camera.

3. The method according to claim 1, wherein the first image is taken by an optical camera.

4. The method according to claim 1, wherein the first image is taken by a radiometric camera.

5. The method according to claim 1, wherein the first image is taken as a coarse scan.

6. The method according to claim 5, wherein the step of determining a region of interest includes determining regions with a high radiometric or active radar signal.

7. The method according to claim 5, wherein the scanned image is generated in a high-resolution mode.

8. The method according to claim 1, further comprising:
displaying the first image and the region of interest in an overlapping mode on a display;
moving a window on the display to a second region of interest;
generating said scanned image of the second region of interest.

9. A handheld screening device comprising:
an active radar scan unit; and
a processor to
determine a region of interest in a first image by searching for regions in the first image that match templates stored in memory; and
control the active radar scan unit to generate an active radar scan of the region of interest.

10. The handheld screening device according to claim 9, further comprising
a camera to take the first image.

11. The handheld screening device according to claim 9, wherein the processor is further configured to generate the first image based on a low-resolution active radar image of the active radar scan unit.

12. The handheld screening device according to claim 9, further comprising
a display to display the first image; and
a user interface to allow to selecting the region of interest.

13. A handheld electronic device, comprising:
an active radar scanner; and
circuitry configured to
determine a region of interest in a first image by searching for regions in the first image that match templates stored in a memory; and
control the active radar scanner to generate an active radar scan of the region of interest.

14. The handheld electronic device of claim 13, wherein the first image is taken as a coarse image.

15. The handheld electronic device of claim 13, further comprising:
an optical camera configured to capture the first image.

16. The handheld electronic device of claim 13, wherein the first image is taken by the active radar scanner.

17. The handheld electronic device of claim 13, wherein the circuitry is configured to determine an object of interest included in the active radar scan of the region of interest by searching for objects in the active radar scan that match templates stored in a memory.

18. The handheld electronic device of claim 17, further comprising:
a user interface, wherein
the processor is configured to control the user interface to output an alert when an object in the active radar scan matches a template stored in the memory.

* * * * *